May 9, 1939. A. E. VOSLER 2,157,642
TURNING TABLE
Filed Oct. 19, 1936 3 Sheets-Sheet 1
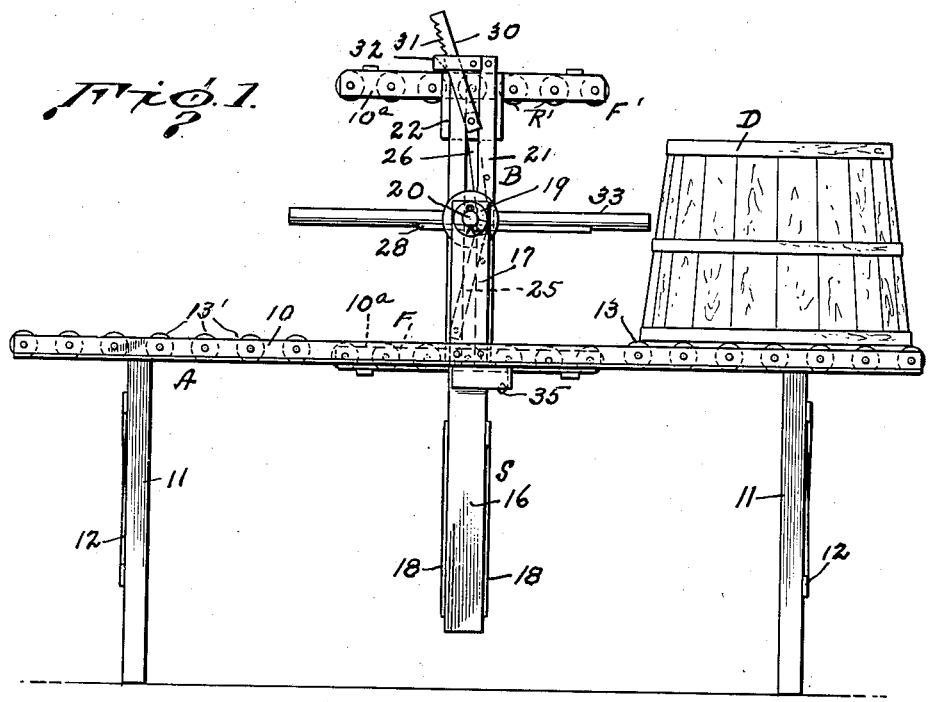
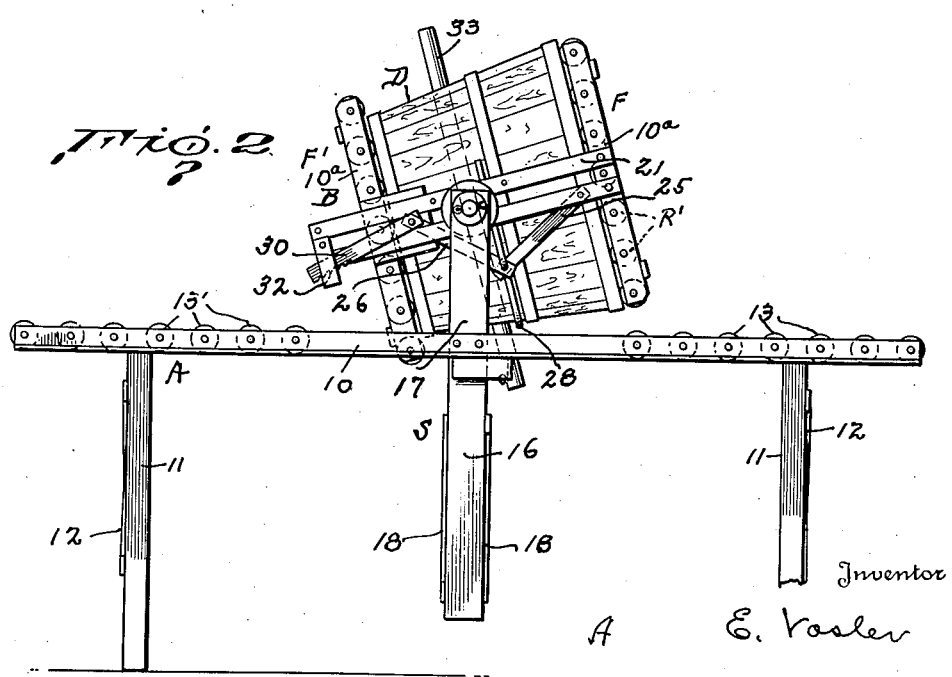
Inventor
A. E. Vosler
By Wm S. Hodges
Attorney May 9, 1939.  A. E. VOSLER  2,157,642
TURNING TABLE
Filed Oct. 19, 1936   3 Sheets-Sheet 2
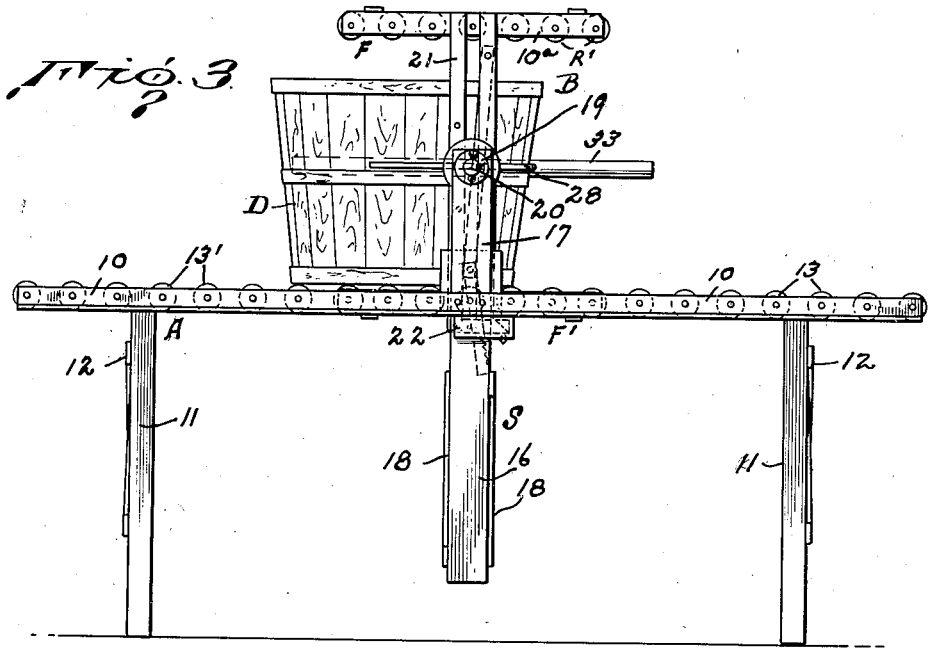
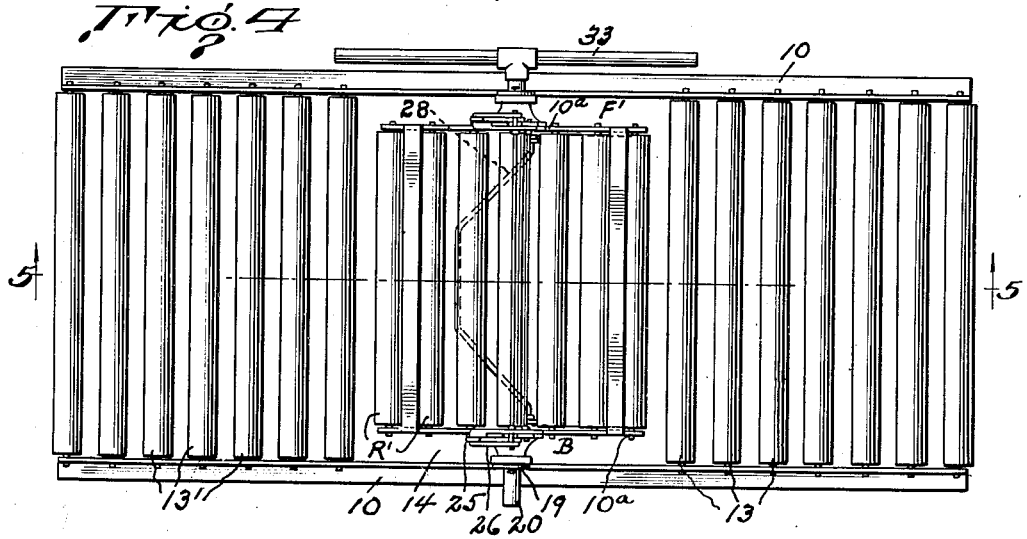
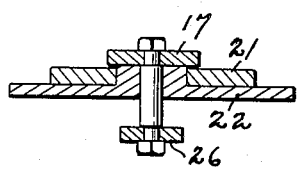
Inventor
A. E. Vosler
By Wm. D. Hodges
Attorney

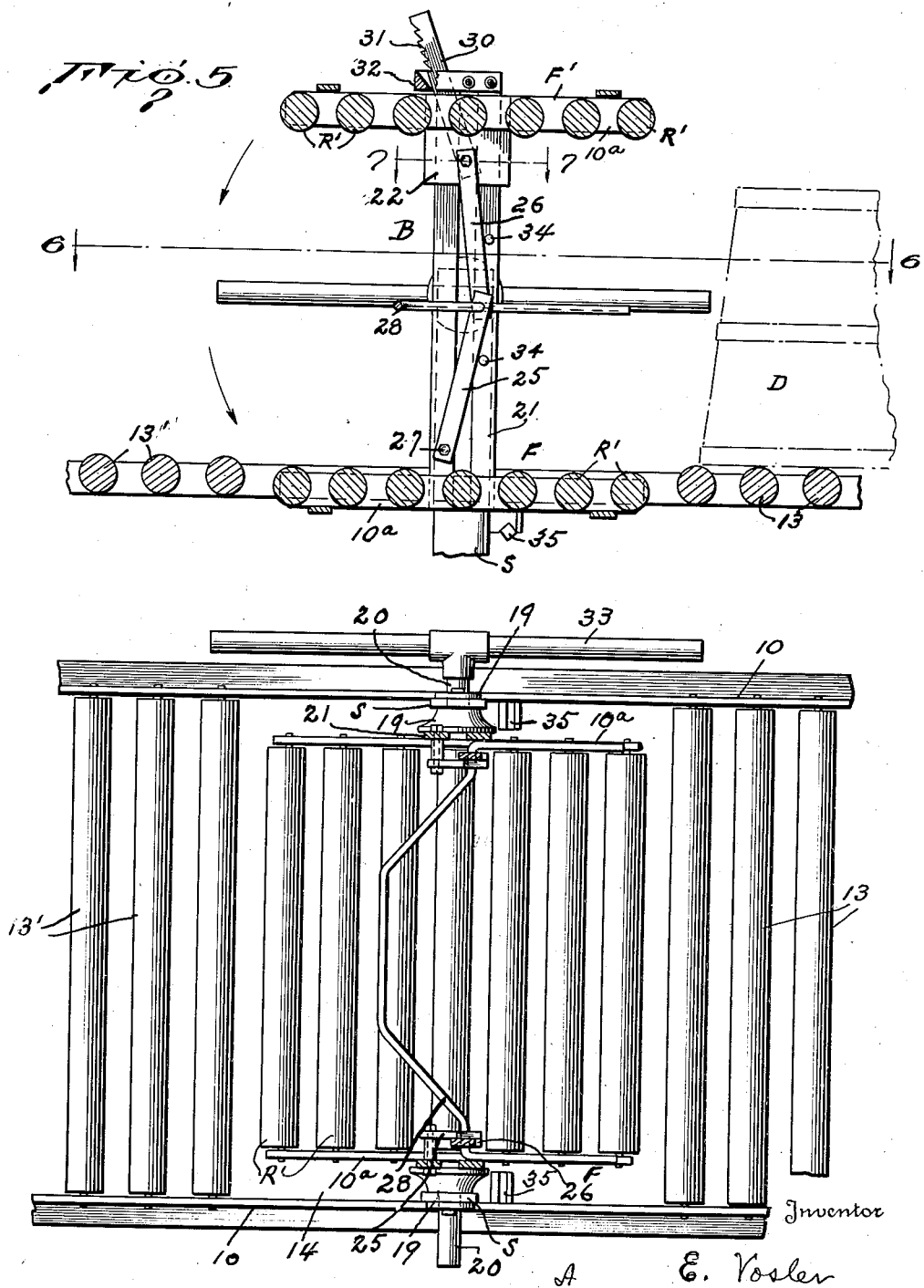

Patented May 9, 1939

2,157,642

UNITED STATES PATENT OFFICE 2,157,642

TURNING TABLE

Arthur E. Vosler, Medina, N. Y., assignor to Niagara Sprayer and Chemical Co., Inc., Middleport, N. Y., a corporation Application October 19, 1936, Serial No. 106,478

13 Claims. (Cl. 214—130)

This invention is a device for reversing baskets, and other similar receptacles, which have been packed while in an inverted position.

In packing apples, it is common practice to "top" the package, i. e. to arrange a layer of choicer fruit over the top of the basket or other container, with the less desirable fruit beneath. This is usually accomplished by arranging the top layer over the inner face of the basket top, and then placing the inverted basket thereover, after which the top is fastened in place. While the basket remains in the inverted position, so that the topping layer is temporarily at the bottom, it is filled by placing the other fruit on top of the previously arranged top layer, and the final operation is to permanently secure the bottom piece in position, so that the contents of the basket will be held in place. Inasmuch as the package has thus been completed while in an inverted position, it is necessary to reverse or "up-end" it before it may be conveniently removed to a place of storage or shipment. One of the objects of the present invention is to provide simple and inexpensive means by which a basket or similar container, previously packed in an inverted position, may be readily and quickly reversed or turned so as to occupy its normal up-ended position. A further object is to provide a simple clamping means so constructed and arranged that it may be readily brought into engagement with the inverted basket, and to firmly clamp the basket against slipping during the reversing operation.

The invention will be hereinafter fully set forth and particularly pointed out in the claims.

In the accompanying drawings, Figure 1 is a side elevation illustrating an inverted basket about to be moved into position for turning. Figure 2 is a similar view illustrating the basket during the turning operation. Figure 3 is a similar view illustrating the basket in up-ended position. Figure 4 is a top plan view. Figure 5 is a longitudinal sectional view on the line 5—5, Figure 4. Figure 6 is a horizontal sectional view on the line 6—6, Figure 5. Figure 7 is a detail sectional view on line 7—7, Figure 5.

Referring to the drawings, A designates a conveyor frame formed of side bars 10, preferably constructed of angular iron or similar metal, sustained by legs 11, which may be braced in any suitable or desired manner, such as by cross bars 12. Mounted between the side bars 10 are a plurality of conveyor rollers arranged in two series 13 and 13', separated by an intermediate space 14.

Secured to the side bars of the conveyor frame are two vertical supporting bars S, one on each side of the frame and at positions intermediate between the ends of the space 14. Said supporting bars are provided with portions 16 depending below the plane of frame A, and upwardly extended portions 17 extended above the plane of the said frame, the portions 16 being suitably braced as by cross bars 18.

The upwardly projecting portions 17 of the supporting bars S are provided with bearings 19 for the trunnion 20 and a reversing frame B. Said reversing frame comprises two side members 21, each formed of a pair of relatively spaced parallel bars carrying the trunnions 20. The lower ends of the side members 21 are connected by a clamp frame F, fixedly secured thereto, which consists of two relatively spaced side bars 10ª carrying conveyor rollers R' designed to be aligned with the rollers R of both series 13 and 13', while in horizontal position. Complemental to the fixedly secured clamp frame F is a movable clamp frame F'', also consisting of side bars 10ª and carrying rollers R', but slidably mounted with respect to the first-mentioned stationary member, being guided by means of slidable guide pieces 22 interposed between the spaced apart side members 21.

The movable frame F'' is adjusted with respect to the stationary frame F by means of toggle devices, each device consisting of two levers 25 and 26, each lever 25 being pivotally connected at its lower end to a side member 21, as indicated at 27. The upper end of each lever 25 is pivotally connected to an offset portion of a transversely positioned bowed rod 28 of an actuator member. Each lever 26 has its upper end pivotally connected to a guide piece 22, and its lower end connected to said offset portion of the bowed rod 28. The ends of the bowed rod 28 extend approximately parallel with the side bars 10. In order to prevent disengagement of the clamping means during the turning movement of the basket, the guide pieces 22 have detents 30 pivotally connected thereto, said detents having teeth 31, which engage suitably disposed lugs 32, fixedly secured to the upper ends of the guide bars 21. Rotative movement is imparted to the reversing frame by means of a suitable handle 33 connected to one of the trunnions 20. Movement of the toggle levers in one direction is limited by stops 34, and a lug 35 is so positioned as to disengage the latch 30 from the lug 32 after the basket has been inverted.

In practice, during the packing of the basket

D, the frame F" is held in elevated position as shown in Figures 1 and 5, by reason of the engagement of the toggle levers 25 and 26 with the stops 34. After the bottom has been secured in position in the inverted basket, the operator moves the filled basket over the rollers of section 13, the travel being to the left, as viewed in Figure 1, and until said basket has been transferred to the rollers R' of the frame F. During such travel, frame F' is in a plane sufficiently high to provide ample clearance for the movement of the basket. During travel of the basket to its position upon the frame F', it is brought into engagement with the bowed member 28, and exerts a pull thereon, the effect of which is to first straighten the toggle levers 25 and 26 and thereby elevate the frame F", and as the pivotal connections of said levers are pulled beyond the dead center, the frame F" will be drawn downwardly into engagement with the bottom of the basket, clamping said basket between the frames F and F" and locking them in such clamped position, by reason of the engagement of the detents 30 with the lugs 31. By then grasping the handle 33, the operator may readily rotate the reversing frame in such manner as to invert the basket, so as to bring it into normal up-ended position, with the rollers R' of said upper frame F" in register with the rollers 13 and 13'. During rotation the weight of the filled basket, bearing upon member 28 tends to maintain the clamping pressure upon frame F". After rotation of the basket, the position of the bowed member 28 has been reversed, and the detents having been disengaged from lugs 32 during rotation, the member 28, may be pulled in a direction to separate frames F and F" sufficiently to permit the basket to be readily rolled out upon the rollers R of conveyor section 13'. The frame is then rotated in reverse to its normal position and is ready for the next basket, and the operation repeated.

The advantages of the invention will be readily understood by those skilled in the art to which it belongs. It will be particularly observed that a very simple and inexpensive device is provided for up-ending a basket which has been packed while in an inverted position, and that the basket is firmly clamped in such manner that it will be firmly held during the inverting operation. It will also be noted that the device is a very simple structure and readily manipulated. It is to be understood that although the device has been described and claimed with respect to the function of inverting baskets which have been packed with apples, the invention is not limited in this particular, but may be used for inverting any other receptacle and irrespective of the material with which it may be packed.

Having thus explained the nature of the invention and described an operative manner of constructing and using the same, although without attempting to set forth all of the forms in which it may be made, or all of the forms of its use, what is claimed is:—

1. A turning device for reversing the position of a basket or the like, comprising a table like support over which the basket may be moved and having an opening in its top, a rotatively supported carrier positioned in register with said opening, said carrier including oppositely disposed relatively adjustable frames normally positioned one above the other to alternately lie in said opening and constructed to clamp a basket or other article between them, means for effecting relative clamping adjustment of said frames, means operated by the pressure of the basket thereagainst for actuating said adjusting means, when the basket is positioned between the adjustable frames, and means by which the carrier may be rotated.

2. A turning device of the character described, comprising a table having an opening in its top, a rotatively supported carrier positioned in register with said opening, said carrier including oppositely disposed relatively adjustable frames constructed and arranged to clamp a basket between them, means for effecting relative clamping adjustment of said members, operating means for actuating said adjusting means, so constructed and arranged as to be actuated by positioning of the basket between the adjustable frames, a slidable clamping bar movable with one of said frames, one edge of said bar having teeth therein, a locking lug carried by said carrier and complemental to said teeth, and means by which the carrier may be rotated.

3. A turning device for reversing the position of a basket or the like, comprising a table-like support over which the basket may be moved and having an opening in its top, a rotatively supported carrier positioned to register with said opening, said carrier including two oppositely disposed relatively adjustable clamp frames normally positioned one above the other to alternately lie in said opening and constructed to clamp a basket between them, an actuator member extending transversely across the carrier frame between said clamp frames, operating means connecting the actuator means with the frames in such manner that movement of the actuator member by the basket, as the latter is positioned will effect relative clamping adjustment of said frames, means actuated when said frames are moved in clamping position to automatically and temporarily lock the frames in clamped position, and means by which the carrier may be rotated.

4. A turning device for reversing the position of a basket or the like, comprising a table-like support over which the basket may be moved and having an opening in its top, a rotatively supported carrier positioned in register with said opening, said carrier including two oppositely positioned frames normally positioned one above the other to alternately lie in said opening, one of which is movable with respect to the other, and so arranged as to clamp a basket between them, an actuator member extending transversely across said carrier between said frames, toggle levers connecting said actuator member and said frames in such manner that operation of the actuator member by the placing of a basket in position will automatically impart movement to said movable frame, and means by which the carrier may be rotated.

5. A turning device comprising a table having an opening in its top, a rotatively supported carrier positioned in register with said opening, said carrier having a frame fixedly secured at one end thereof, a second frame slidably mounted in said carrier, an actuator member extending transversely across the table, operating means connecting said actuator member and said slidable frame, means actuated by the movement of said slidable frame for temporarily locking the frames in clamped position, and means by which the carrier may be rotated.

6. A turning device of the character described, comprising a table having two series of rollers rotatively mounted therein and separated by an intermediate space, a rotatively supported carrier positioned in register with said intermediate space, a clamp frame fixedly secured to one end of said carrier and provided with rollers positioned to register with the first-mentioned conveyor rollers, a second clamp frame slidably engaging the carrier and also having conveyor rollers so positioned as to register with the first-mentioned conveyor rollers, an actuator member extending transversely across the table between said clamp members, toggle levers pivotally connected to said actuator member and with the respective clamp frame, and means by which the carrier may be rotated.

7. A turning device of the character described, comprising a table having two series of conveyor rollers separated by an intermediate space, uprights secured to said table at positions within said space, a carrier rotatively engaging said uprights, a clamp frame fixedly secured to one end of said carrier and having conveyor rollers so positioned as to register with the first-mentioned conveyor rollers in one position of the carrier, a second clamp frame slidably mounted in the carrier and also having conveyor rollers so positioned as to register with the first-mentioned series of rollers in another position of the carrier, a transversely disposed bowed actuator member having offset portions, toggle levers pivotally connected to the offset portions of said actuator and to said clamp frames, means for temporarily locking the clamp frames in clamped position, and means by which said carrier may be reversed.

8. A turning device for reversing the position of a basket or the like, comprising a table-like support over which the basket may be moved and having an opening in its top, vertically disposed support members secured to said table on opposite sides of said opening, a pair of guide members rotatably mounted in said support members, a pair of clamp frames arranged one above the other to clamp a basket therebetween and adapted to alternately lie in said opening, one of said frames being fixedly connected with said guide members and the other slidably engaged with said guide members, toggle levers connecting said guide members with said slidably engaged clamp frame, and means for moving said toggle levers.

9. A turning device for reversing the position of a basket or the like, comprising a table-like support over which the basket may be moved and having an opening in its top, vertically disposed support members secured to said table on opposite sides of said opening, a pair of guide members rotatably mounted in said support members, a pair of clamp frames arranged one above the other to clamp a basket therebetween and adapted to alternately lie in said opening, one of said frames being fixedly connected with said guide members and the other slidably engaged with said guide members, two pairs of toggle levers, there being one pair for each guide member, one lever of each pair being connected with its guide member and the other toggle lever being connected with the movable clamp frame, and an operating member connecting the toggle levers of each pair.

10. A turning device for reversing the position of a basket or the like, comprising a table-like support over which the basket may be moved and having an opening in its top, vertically disposed support members secured to said table on opposite sides of said opening, a pair of guide members rotatably mounted in said support members, a pair of oppositely arranged clamping frames mounted to alternately lie in said opening, one of said frames being fixedly connected with said guide members, guide pieces slidably engaging said guide members, the other clamping frame being secured to said guide pieces, toggle levers connecting said guide pieces and said guide pieces, means for moving said toggle levers, and means carried by the guide members for limiting movement of the toggle levers in one direction.

11. A turning device of the character described, comprising a table having an opening in its top, vertically disposed support members secured to said table on opposite sides of said opening, a pair of guide members rotatably mounted in said support members, clamp frames, one of which is fixedly connected with said guide members and the other slidably engaged with said guide members, two pairs of toggle levers, there being one pair for each guide member, one lever of each pair being connected with its guide member and the other toggle lever being connected with the movable clamp frame, and a bowed rod extending transversely of said table and having offset portions pivotally connecting the adjacent ends of the respective pairs of toggle levers.

12. A turning device of the character described comprising a table having an opening in its top, a rotatively supported carrier positioned in register with said opening, said carrier including oppositely disposed relatively adjustable frames constructed and arranged to clamp a basket or other article between them, means for effecting relative clamping adjustment of said frames, means operated by the pressure of the basket thereagainst, actuating said adjusting means when the basket is positioned between the adjustable frames, means by which the carrier may be rotated, and means actuated by the clamping movement of said frames for temporarily locking the frames in clamping position.

13. A turning device of the character described comprising a table having an opening in its top, a rotatively supported carrier positioned in register with said opening, said carrier including oppositely disposed relatively adjustable frames constructed and arranged to clamp a basket or other article between them, means for effecting relative clamping adjustment of said frames, means operated by the pressure of the basket thereagainst, actuating said adjusting means when the basket is positioned between the adjustable frames, means by which the carrier may be rotated, and means actuated by the clamping movement of said frames for temporarily locking the frames in clamping position, and means for automatically releasing said temporary locking means when the turning operation of the carrier has been completed.

ARTHUR E. VOSLER.